United States Patent [19]

Morimoto

[11] Patent Number: 5,194,981
[45] Date of Patent: Mar. 16, 1993

[54] LIGHT SCANNING APPARATUS

[75] Inventor: Akira Morimoto, Tokyo, Japan

[73] Assignee: Asahi Kogaku Kogyo Kabushiki Kaisha, Tokyo, Japan

[21] Appl. No.: 424,942

[22] Filed: Oct. 23, 1989

[30] Foreign Application Priority Data

Oct. 21, 1988 [JP] Japan .................. 63-265811
Nov. 1, 1988 [JP] Japan .................. 63-276965

[51] Int. Cl.$^5$ .......................................... G02B 26/08
[52] U.S. Cl. .................... 359/212; 359/217; 359/219; 359/618; 250/235; 346/108
[58] Field of Search ............... 359/212, 213, 216, 217, 359/196, 223, 618, 831, 204; 250/235, 236; 358/296, 481; 346/108

[56] References Cited

U.S. PATENT DOCUMENTS

| | | | |
|---|---|---|---|
| 4,306,242 | 12/1981 | Jeffery | 346/1.1 |
| 4,390,235 | 6/1983 | Minoura | 359/196 |
| 4,617,578 | 10/1986 | Nezu et al. | 346/108 |
| 4,776,654 | 10/1988 | Ishizuka et al. | 359/217 |
| 4,850,686 | 7/1989 | Morimoto et al. | 359/211 |
| 4,946,234 | 8/1990 | Sasada et al. | 359/213 |

FOREIGN PATENT DOCUMENTS

| | | |
|---|---|---|
| 3020241 | 12/1980 | Fed. Rep. of Germany . |
| 56-107212 | 8/1981 | Japan . |
| 57-84440 | 5/1982 | Japan . |
| 59-15216 | 1/1984 | Japan . |
| 62-235918 | 10/1987 | Japan . |

OTHER PUBLICATIONS

English abstract of Japanese Patent 56-107212.
English abstract of Japanese Patent 59-15216.
English abstract of Japanese Publication No. 57-84440.

Primary Examiner—Loha Ben
Attorney, Agent, or Firm—Sandler, Greenblum & Bernstein

[57] ABSTRACT

A light scanning apparatus is disclosed having: a light source portion, a correction deflecting element for finely deflecting a light beam emitted by the light source portion in an auxiliary scanning direction, a scan deflector for deflecting the light beam from the correction deflecting element in a principal scanning direction, a lens system disposed between the correction deflecting element and the scan deflector and adapted to bring both of them in an optically conjugate relation, and a scanning lens for imaging the light beam deflected by the scan deflector onto a scanning surface.

32 Claims, 8 Drawing Sheets

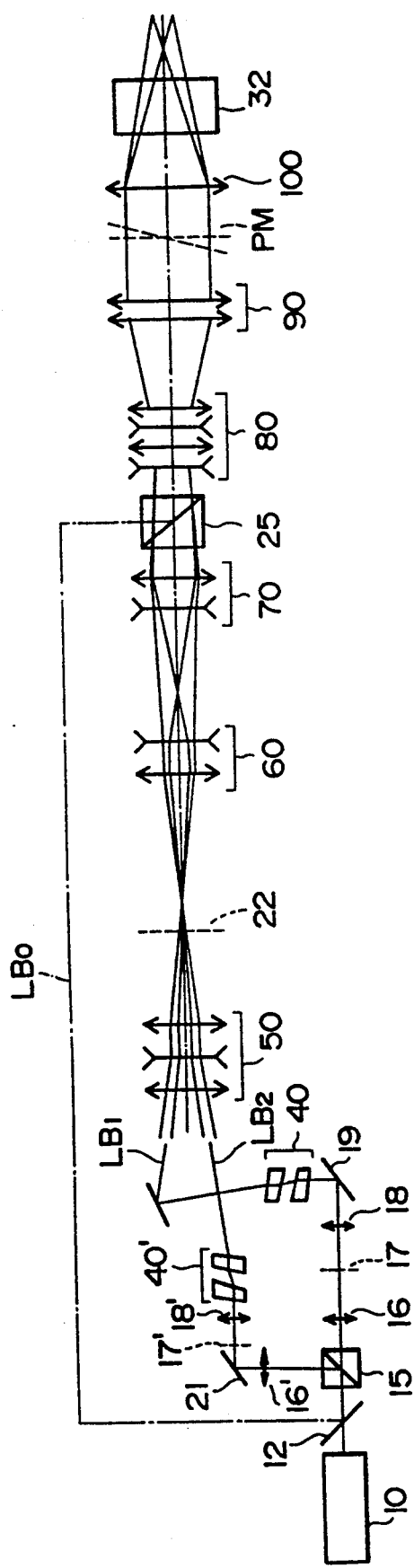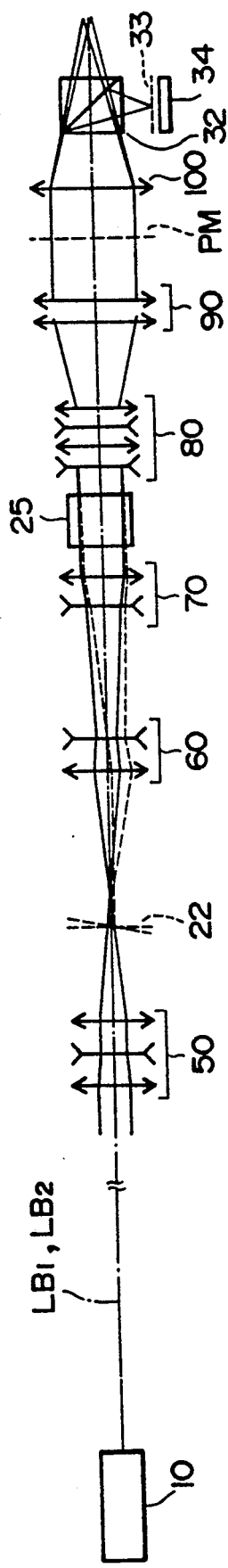
FIG. 2
FIG. 3

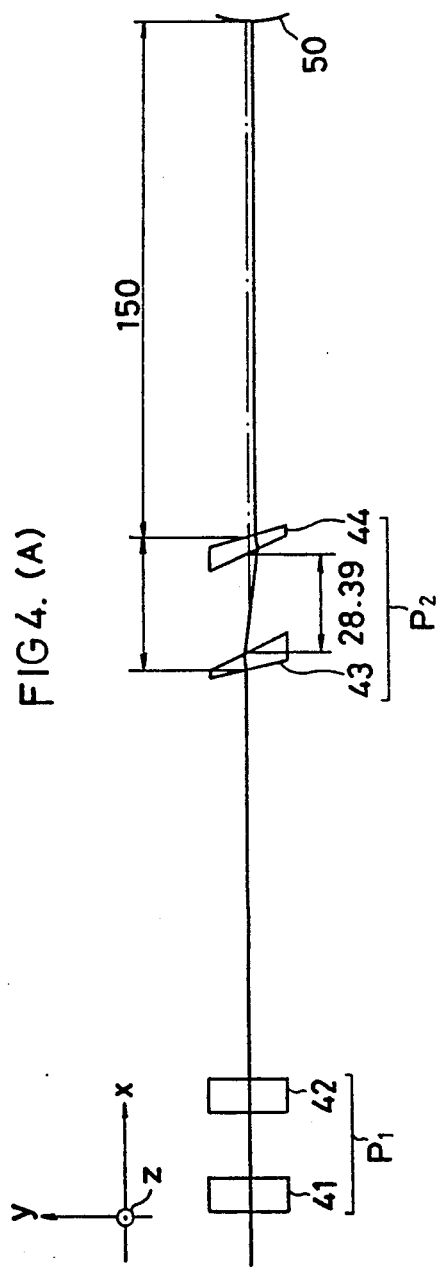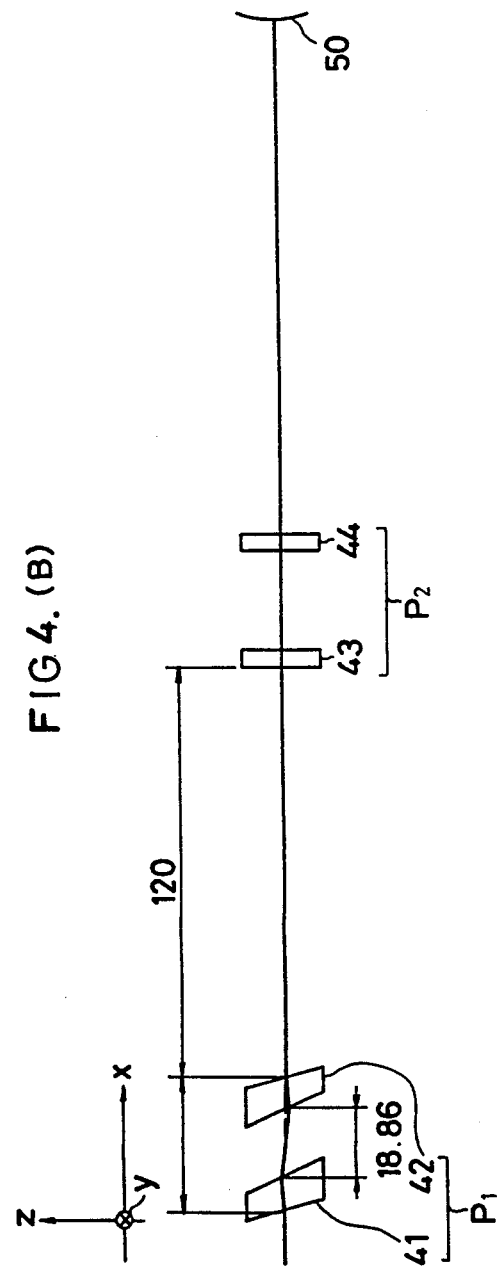

LIGHT SCANNING APPARATUS

BACKGROUND OF THE INVENTION

1. Field of the Invention

This invention relates to a light scanning apparatus used in a laser exposure device for drawing an accurate pattern with a laser beam, and more particularly to a light scanning apparatus having a function for correcting the tilt of a surface of a scan deflector for scanning a light beam.

2. Description of the Prior Art

An ideal polygon mirror, such as a scan deflector, reflecting surface which is parallel with the rotational axis, and spot scans the same line when a laser beam is reflected by any surface. In practice, however, an inclination of the reflecting surface occurs with respect to the rotational axis owing to machining errors, etc. In other words, the tilt of a surface takes place. Consequently, the scanning line for each reflecting surface is displaced in an auxiliary scanning direction. In this specification, the direction in which scanning is performed on the scanning surface is referred to as the principal scanning direction, and the direction that is normal to the principle scanning direction is referred to as the auxiliary scanning direction.

It is technically difficult to remove the tilt surface error of by improving the machining accuracy of the polygon mirror which often involves significant costs.

In view of the above, there has heretofore been proposed means for removing the adverse affection of this surface tilting by providing a correcting optical system.

In Japanese Patent Early Laid-open Publication No. Sho 59-15216, there is disclosed a method for diminishing the adverse affection due to the surface tilting of the reflecting surface by converging light beams in such a manner as to form a line image in the principal scanning direction on a reflecting surface of a polygon mirror.

However, it is still difficult to completely correct the surface tilting by this method. Also, when this method is adopted, it becomes necessary to provide an anamorphic lens system which has different powers in a principal scanning plane and in an auxiliary scanning plane in order to form a line image, and it is difficult to manufacture such a lens system, compared to a spherical lens. In particular, it is difficult to manufacture an anamorphic lens system that is suitable for an apparatus that is required to have an ability to draw a high accuracy pattern.

Such a construction as shown, for example, in Japanese Patent Early Laid-open Publication No. Sho 56-107212 discloses a case where the surface tilting is to be corrected while utilizing a spherical lens as a lens system, in that an acousto-optic modulator (AO modulator) is disposed between a light source and a polygon mirror in order to finely deform the angle of incidence in the auxiliary scanning direction.

Although it is not disclosed in this Publication, a beam expander system is actually provided in view of the necessity to make large the diameter of the light beam which is made incident to a scanning lens in order to reduce the spot on the scanning surface.

An AO modulator has a response frequency which is in inverse proportion to the diameter of the light beam on the modulator. Thus, the AO modulator must be disposed in a position having a small diameter of the light beam in order to render a modulation function. Therefore, the AO modulator is often disposed in parallel light beams on the light source side from the beam expander system.

FIG. 14 shows an example in which the AO modulator is disposed in the parallel light beams on the light source side (left-hand side in the Figures) from the beam expander system, FIG. 14 shows one example using a beam expander of a Galilean type. In the Figure, the solid line shows an optical path before being deflected by the AO modulator and the broken lines show the optical path after being deflected by the AO modulator.

In the Figure, if the focal length of a first lens group $L_1$ is taken as $f_1 (<0)$ and the focal length of a second lens group $L_2$ is taken as $f_2 (>0)$, the magnification M of the beam expander system can be expressed as follow;

$$M = -f_2/f_1$$

and if the angle of inclination of the light beam for correcting the surface tilting is taken as $\theta_P$, the angle of deflection $\theta_m$ is expressed by the following relation ①.

$$\theta_m = M \cdot \theta_P \qquad ①$$

Next, if the distance from the AO modulator to the first lens group $L_1$ is taken as $d_0$ and the distance from the second lens group $L_2$ to the polygon mirror is taken as $d_1$, the displaced amount S of the light beam can be expressed by the following relation ②.

$$S = \{M^2 \cdot d_0 + M(f_1 + f_2) + d_1\} \cdot \theta_P \qquad ②$$

For example, let us suppose there is a beam expander system for expanding the diameter of a light beam from 1 mm to 20 mm where $f_1 = 10$, $f_2 = 200$, $M = -20$, and $d_0 = 100$, and the surface tilting of the reflecting surface of the polygon mirror is taken as $10''$, and the correction angle $\theta_P$ becomes $20''$. Therefore, the angle of deflection of the AO modulator becomes $\theta_m = -0.11°$ from the relation ①. Also, the displaced amount of the light beam on the reflecting surface of the polygon mirror becomes $S = 3.5$ from the relation ②, assuming $d_1 = 100$.

Accordingly, although the angle error of the reflected light beam due to the surface tilting can be corrected, the beam on the reflecting surface of the polygon mirror shifts in a parallel relation in accordance with this correction. In addition the position of the beam, which is incident to the scanning lens, gets out of a regular position. Accordingly a sharpness of the spot on the scanning surface deteriorates. This gives rise to a problem when a high accuracy drawing is to be obtained.

Also, there is another problem in that the controlling of the AO modulator is difficult in order to obtain a fine angle such as $\theta_m = -0.11°$.

Furthermore, in the Japanese Patent Early Laid-open Publication No. SHO 62-235918, there is disclosed a construction in which two modulators are provided, one for correcting the surface tilting and the other for rectifying the shifting amount of the light beam. With this construction, however, in order to provide two AO modulators, the degree of freedom for designing the optical system becomes small and the electrical controlling becomes complicated.

SUMMARY OF THE INVENTION

The present invention has been accomplished in view of the above-mentioned problems. The object of the present invention is to provide a light scanning apparatus which makes it possible to draw a high accuracy pattern by reducing the shifting of reflected light beams which is taken place when an angle error of the reflected light beam due to the surface tilting is corrected.

The present invention is characterized in that a correction deflecting element for finely deflecting light beams emitted from a light source in the auxiliary scanning direction and a scan deflector for deflecting the light beam coming from the correction deflecting element in the principal scanning direction are generally optically conjugated with each other. The expression "optically conjugated" does not necessarily mean that they are in an imaging relation, but it will be understood from this expression that if only the principal ray is taken into consideration, no positional displacement is occurred even when the angle error of the light beam is taken place.

BRIEF DESCRIPTION OF THE DRAWINGS

FIG. 2 is a sectional view showing a part of the optical system of FIG. 1 taken in the principal scanning direction;

FIG. 3 is a sectional view of FIG. 2, but taken in the auxiliary scanning direction; and FIGS. 4(A) and 4(B) are explanatory views showing a section of a light beam direction adjusting device.

FIGS. 5 through 11 are schematic views showing correlation among a beam expander system, an AO modulator and a polygon mirror, in which FIG. 5 shows a beam expander system of a Keplerian type which includes the AO modulator disposed in parallel light beams;

FIG. 6 shows a beam expander system which includes the AO modulator disposed in converged light;

FIG. 7 shows a system which is provided with a relay lens disposed in a light converging point of FIG. 5;

FIG. 8 shows a system which is provided with a relay lens in a light converging point of FIG. 6;

FIG. 9 is a modified embodiment of the relay lens shown in FIG. 7;

FIG. 10 shows beam expander system in a cascade fashion; and

FIG. 11 shows an example which is further provided with a beam expander behind the system of FIG. 8.

DETAILED DESCRIPTION OF THE EMBODIMENTS

The embodiment of the present invention will be described hereinafter with reference to the drawings.

Referring first to FIGS. 5 through 11, there will be described conditions of the conjugated relation between a correction deflecting element and a scan deflector.

The expression "optically conjugated" means that a ray transfer matrix $R_P$ of an optical system between the correction deflecting element and a reflecting surface of the scan deflector can be expressed as follows;

$$R_P = \begin{bmatrix} m & 0 \\ -1/f & 1/m \end{bmatrix}$$

The ray transfer matrix is a transfer function of paraxial rays and it means that height $h_1$ in the input plane and angle $\alpha_1$ are converted into $h_2$ and $\alpha_2$ in an output plane.

$$\begin{bmatrix} h_2 \\ \alpha_2 \end{bmatrix} = \begin{bmatrix} A & B \\ C & D \end{bmatrix} \begin{bmatrix} h_1 \\ \alpha_1 \end{bmatrix}$$

The ray transfer matrix terms A, B, C, and D are used only to indicate a form of $2 \times 2$ matrix, specific forms of which are referred to hereinafter as $R_T$ and $R_P$, e.g. The beam expander becomes an afocal system of magnification M as the whole system. Therefore, if the distance from the light source to the first lens group $L_1$ is taken as $d_4$ and a constant corresponding to this distance $d_4$, as K, it has a ray transfer matrix $R_T$ as expressed as follows:

$$R_T = \begin{bmatrix} M & K(d_4) \\ 0 & 1/M \end{bmatrix}$$

The ray transfer matrix of the whole system of the beam expander shown in FIG. 5 can be expressed as follows;

$$R_T = \begin{bmatrix} M & f_1 + f_2 + M \cdot d_4 + (d_1/M) \\ 0 & 1/M \end{bmatrix}$$

Also, a relation between the correction deflecting element and the scan deflector in the Figure is expressed by a matrix as shown hereunder, as the correction deflecting element is located in front of the beam expander system;

$$R_P = \begin{bmatrix} M & f_1 + f_2 + M \cdot d_0 + (d_1/M) \\ 0 & 1/M \end{bmatrix}$$

presuming the magnification $M = -f_2/f_1$. The condition for correcting a deflecting element and the scan deflector to become conjugated with each other is as follows;

$$f_1 + f_2 + M \cdot d_0 + (d_1/M) = 0$$

Figure 14:
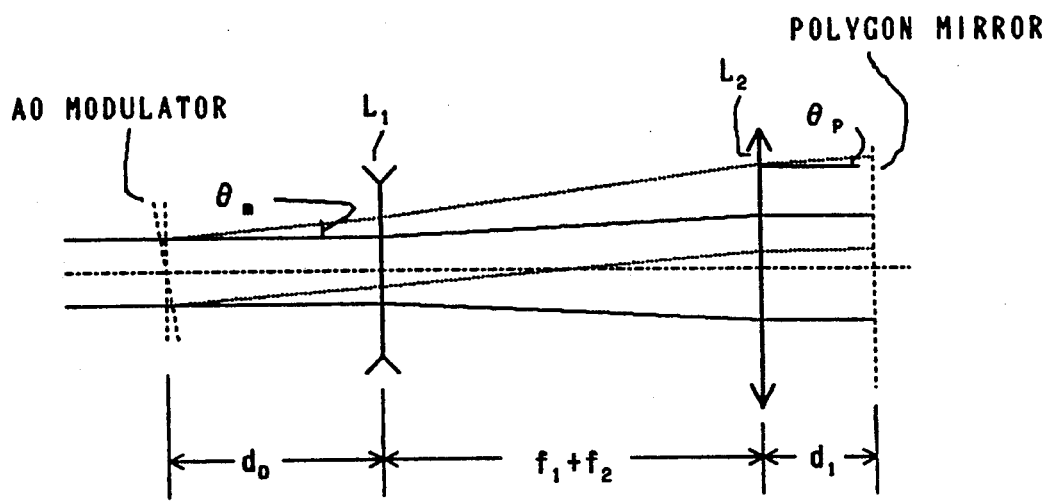
FIG. 14 shows a prior art light scanning apparatus using a Galilean type beam expander system.

The aforementioned relation is applicable to the case shown in FIG. 14. However, as $d_0 > 0, d_1 > 0$ is the premise in this system, they cannot form a conjugated relation in the case where $f_1 < 0$, as shown in FIG. 14. In the case where $f_1 > 0$, such as in FIG. 5, there is a solution which becomes as follows;

$$d_1 = -M^2 \cdot d_0 - M \cdot (f_1 + f_2),$$

only when the following condition is satisfied;

$$d_0 < -(1/M) \cdot (f_1 + f_2),$$

and thus they can form a conjugated relation.

Also, the relation between the angle of inclination $\theta_p$ of the light beam for correcting the surface tilting and the angle of deflection $\theta_m$ of the correction deflecting element is given by $\theta_p = (1/M) \cdot \theta_m$ from the following relation;

$$\begin{bmatrix} 0 \\ \theta_P \end{bmatrix} = R_P \cdot \begin{bmatrix} 0 \\ \theta_m \end{bmatrix}$$

Figure 5:
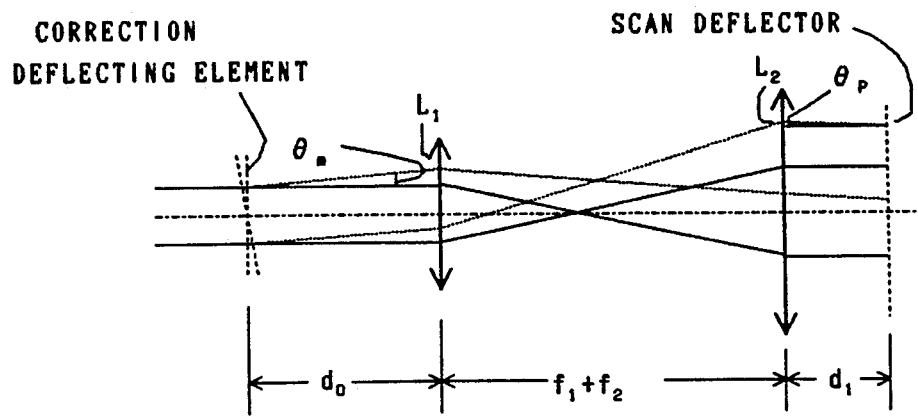

In the system shown in FIG. 5, as the condition with respect to $d_0$ comes in as mentioned above, the condition of conjugation cannot be obtained unless $f_2$ is taken to be large.

Figure 6:
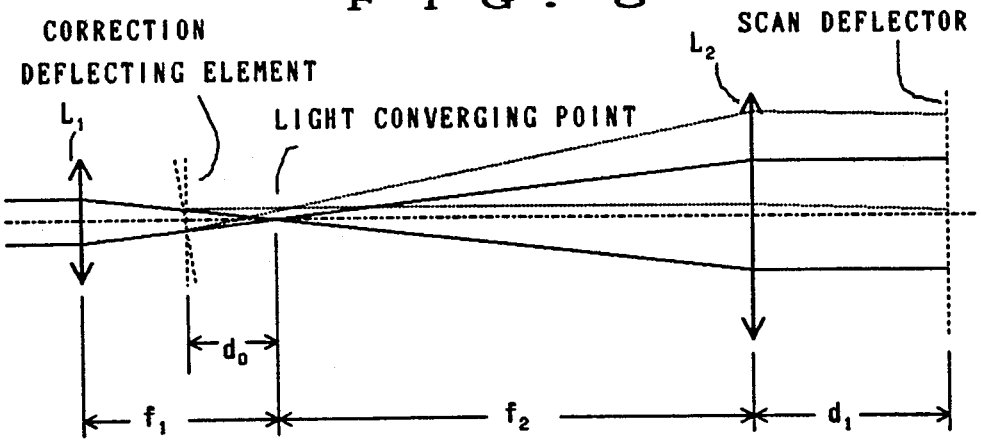

FIG. 6 shows another example in which an AO modulator is disposed within the converged light in the beam expander.

In the Figure, if the distance from the focal position of the first lens group $L_1$ of the focal length $f_1$ is taken as $d_0$, the focal length of the second lens group, as $f_2$, the magnification of the beam expander system, as M, the angle of inclination of the light beam for correcting the surface tilting, as $\theta_p$, and the angle of deflection of the AO modulator, as $\theta_m$, the following relation is established $$\theta_m = -(f_2/d_0) \cdot \theta_p$$

$$S = -f_2 \cdot (1 + f_2/d_0) \cdot \theta_P + d_1 \cdot \theta_P$$

The ray transfer matrix as the whole system of the beam expander system of FIG. 6 can be expressed as follows;

$$R_T = \begin{bmatrix} M & f_1 + f_2 + M \cdot d_4 + (d_1/M) \\ 0 & 1/M \end{bmatrix}$$

and the relation between the angle of inclination $\theta_p$ and the angle of deflection $\theta_m$ can be given by the following relation;

$$\theta_p = -(d_0/f_2) \cdot \theta_m$$

In this way, if the correction deflecting element is disposed in the beam expander system, the relation between the correction deflecting element and the scan deflector can be expressed by the following matrix;

$$R_P = \begin{bmatrix} 1 - (d_1/f_2) & f_2 + d_0 - (d_0 \cdot d_1/f_2) \\ -1/f_2 & -d_0/f_2 \end{bmatrix}$$

and the condition of conjugation is met when the following relation is satisfied;

$$d_0 + f_2 - (d_0 \cdot d_1/f_2) = 0$$

$$\therefore d_1 = f_2 + (f_2^2/d_0)$$

At this time, the following relation is established;

$$1 - (d_1/f_2) = -f_2/d_0 = m$$

wherein m represents the magnification between the correction deflecting element and the scan deflector.

In this system, it is necessary to make $d_1$ very large in order to satisfy the condition of conjugation.

A problem exists in the system shown in FIGS. 5 and 6 in that the values of $d_0$ and $d_1$ are limited in order to satisfy the condition of conjugation. This problem, however, can be temporarily solved by arranging a relay lens RL in the light converging point of the laser beam as shown in FIG. 7 or FIG. 8.

Figure 7:
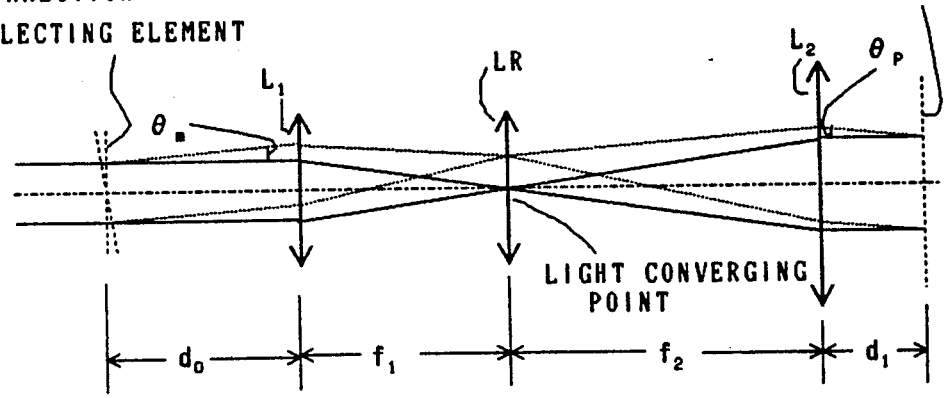
Figure 8:
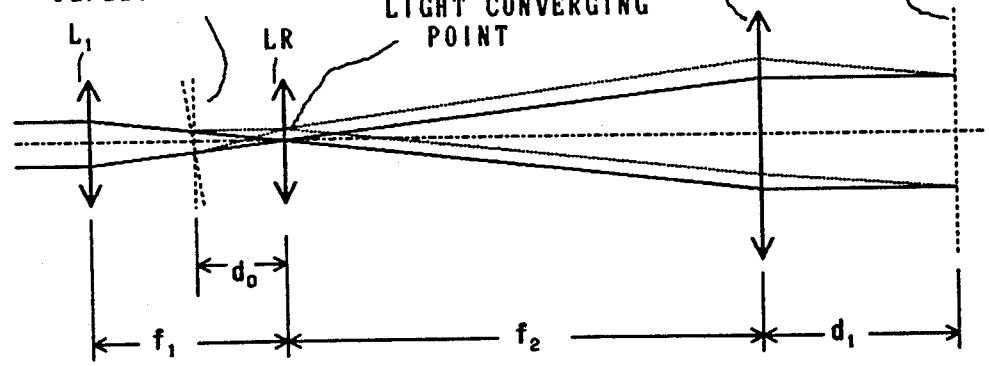

FIG. 7 shows one example in which the construction of FIG. 5 is further provided with the relay lens LR of a focal length fc, and the relation between the correction deflecting element and the scan deflector becomes as follows;

$$R_P = \begin{bmatrix} M & f_1 + f_2 + M \cdot d_0 + (d_1/M) - (f_1 \cdot f_2/fc) \\ 0 & 1/M \end{bmatrix}$$

Also, the condition of conjugation at this time becomes as follows;

$$f_1 + f_2 + M \cdot d_0 + (d_1/M) - (f_1 \cdot f_2/fc) = 0$$

Owing to the addition of a term of $-f_1 \cdot f_2/fc$, the condition with respect to $d_0$ becomes unnecessary.

Also, the relay lens LR does not act on the function as the beam expander system. The ray transfer matrix of the whole system can thus be expressed as follows;

$$R_T = \begin{bmatrix} M & f_1 + f_2 + M \cdot d_4 + (d_1/M) - (f_1 \cdot f_2/fc) \\ 0 & 1/M \end{bmatrix}$$

and the relation between the angle of inclination $\theta_p$ and the angle of deflection $\theta_m$ can be given by $\theta_p = \theta_m/M$.

FIG. 8 shows an example in which the optical system of FIG. 6 is added with the relay lens LR and the relation between the correction deflecting element and the scan deflector can be expressed as follows;

$$R_P = \begin{bmatrix} 1 - (d_1/f_2) - (F_2/fc) & d_0 + f_2 - (d_0 \cdot d_1/f_2) - (f_2/fc) \cdot d_0 \\ (1/f_2) & (d_0/f_2) \end{bmatrix}$$

The condition of conjugation is expressed as follows;

$$d_0 + f_2 - (d_0 \cdot d_1/fc) - (f_2/fc) \cdot d_0 = 0$$

and the degree of freedom is increased. Also, the matrix of the whole system is as follows;

$$R_T = \begin{bmatrix} M & f_1 + f_2 + M \cdot d_4 + (d_1/M) - (f_1 \cdot f_2/fc) \\ 0 & 1/M \end{bmatrix}$$

and the relation between the inclination angle $\theta_p$ and the angle of deflection $\theta_m$ is given by $\theta_p = -d_0 \cdot \theta_m/f_2$.

Figure 9:
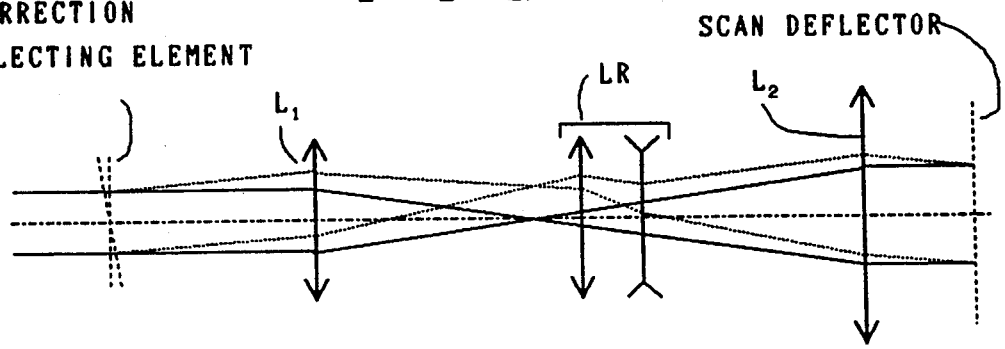

When dust and damage on a lens surface are taken into consideration it is preferable that the relay lens of FIGS. 7 and 8 is not disposed in the light converging point of the laser beam. Therefore, when the principal point of the relay lens is displaced from the light converging point as shown in FIG. 9, the above-mentioned inconveniences can be avoided. In addition, the degree of freedom in design can be increased.

In order to increase the magnification of the beam expander, there is a case where the optical system of FIGS. 5 through 8 is further provided behind itself with a beam expander system in a cascade fashion. In this case, the ray transfer matrix $R_p'$ as a whole is expressed as follows;

$$R_{P'} = R_N \cdot R_{N-1} \cdot \ldots \cdot R_2 \cdot R_1 \cdot R_P$$

wherein $R_1, R_2 \ldots R_{N-1}, R_N$ represent the ray transfer matrix of the beam expander system at the latter stage, and $R_P$ represents the same of the first beam expander.

In such a cascade arrangement, when a conjugate point of the reflecting surface of the scan deflector formed by the second beam expander and a conjugate point of the correction deflecting element formed by the first beam expander are brought to be coincident with each other, the condition of conjugation is satisfied.

In such a case, the relay lens which gives no effect for magnification is not necessarily required.

Figure 10:
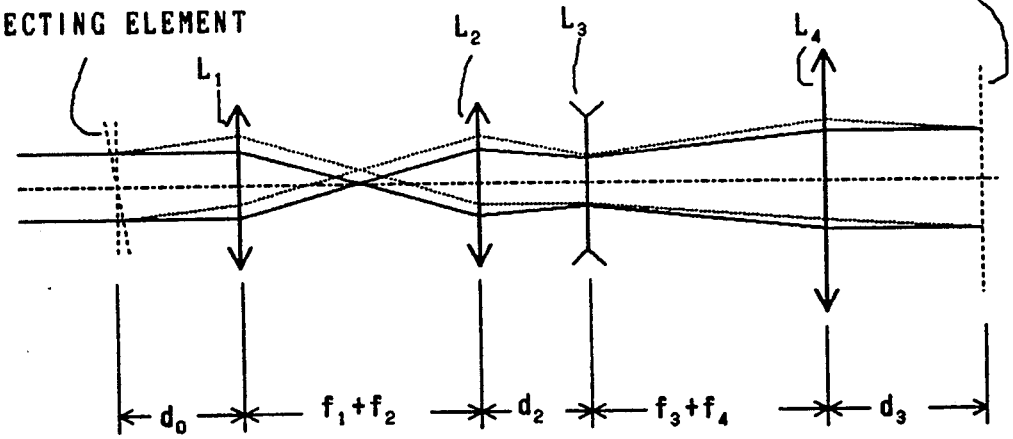

FIG. 10 shows a construction in that the beam expander system is provided in two stages. A first beam expander system which has magnification $M_1$ comprises first and second lens groups $L_1$ and $L_2$ having focal lengths $f_1$ and $f_2$, respectively. If the distance between the conjugate point of the correction deflecting element formed by the first beam expander system and the second lens group $L_2$ is taken as a, the ray transfer matrix $R_{P1}$ between the correction deflecting element and this conjugate point can be expressed as follows;

$$R_{P1} = \begin{bmatrix} M_1 & f_1 + f_2 + M_1 \cdot d_0 + (a/M_1) \\ 0 & 1/M_1 \end{bmatrix}$$

and the following relation is given from the condition of conjugation;

$$f_1 + f_2 + M_1 \cdot d_0 + (a/M_1) = 0$$

$$a = -M_1(f_1 + f_2 + M_1 \cdot d_0)$$

On the other hand, a second beam expander system which has a magnification $M_2$ comprises first and second lens groups $L_3$ and $L_4$ having focal lengths $f_3$ and $f_4$, respectively. If the distance between the conjugate point of the scan deflector formed by the second beam expander system and the third lens group $L_3$ is taken as b, the ray transfer matrix $R_{P2}$ between this conjugate point and the scan deflector can be expressed as follows;

$$R_{P2} = \begin{bmatrix} M_2 & f_3 + f_4 + M_2 \cdot b + (d_3/M_2) \\ 0 & 1/M_2 \end{bmatrix}$$

and the following relation is given from the condition of conjugation;

$$f_3 + f_4 + M_2 \cdot b + (d_3/M_2) = 0$$

$$b = -(1/M_2) \cdot \{f_3 + f_4 + (d_3/M_2)\}$$

If $f_3 < 0$ here, $b < 0$ is obtained from $M_2 > 0$, and a conjugate point is formed within the beam expander.

Furthermore, if a distance between the second lens group $L_2$ and the third lens group $L_3$ is taken as $d_2 = a + b$, the correction deflecting element and the scan deflector are brought to be conjugated with each other and the matrix therebetween can be given by the following expression;

$$\begin{aligned} R_P &= R_{P2} \cdot R_{P1} \\ &= \begin{bmatrix} M_2 & 0 \\ 0 & 1/M_2 \end{bmatrix} \begin{bmatrix} M_1 & 0 \\ 0 & 1/M_1 \end{bmatrix} \\ &= \begin{bmatrix} M_1 \cdot M_2 & 0 \\ 0 & 1/(M_1 \cdot M_2) \end{bmatrix} \end{aligned}$$

Figure 11:
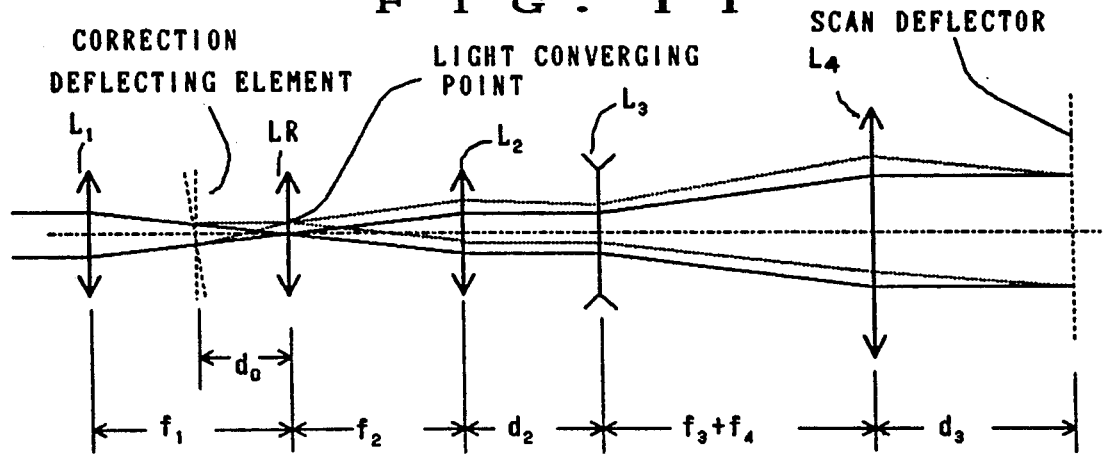

FIG. 11 shows one example of a cascade arrangement which has the optical system of FIG. 8 as the first beam expander and an additional optical system as the second beam expander.

If a distance between the conjugate point of the correction deflecting element formed by the optical system and the second lens group $L_2$ is taken as a, the ray transfer matrix $R_{P1}$ between the correction deflecting element and this conjugate point can be expressed as follows;

$$R_{P1} = \begin{bmatrix} 1 - (a/f_2) - (f_2/f_c) & d_0 + f_2 - (d_0 \cdot a/f_c) - (f_2/f_c) \cdot d_0 \\ (1/f_2) & -d_0/f_2 \end{bmatrix}$$

and the following relation can be established from the condition of conjugation.

$$d_0 + f_2 - (d_0 \cdot a/f_2) - (f_2/f_c) \cdot d_0 = 0$$

$$a = f_2(1 + (f_1/d_0) - (f_2/f_c))$$

On the other hand, if a distance between the conjugate point of the scan deflector formed by the second beam expander system and the third lens group $L_3$ is taken as b, the ray transfer matrix $R_{P2}$ between this conjugate point and the scan deflector can be expressed as follows;

$$R_{P2} = \begin{bmatrix} M_2 & f_3 + f_4 + M_2 \cdot b + (d_3/M_2) \\ 0 & 1/M_2 \end{bmatrix}$$

and the following relation can be given from the condition of conjugation;

$$f_3 + f_4 + M_2 \cdot b + (d_3/M_2) = 0$$

$$b = -(1/M_2) \cdot \{f_3 + f_4 + (d_3/M_2)\}$$

If the distance $d_2$ between the second lens group $L_2$ and the third lens group $L_3$ is taken as $d_2 = a + b$ here, the correction deflecting element and the scan deflector are brought to be conjugated with each other and the matrix therebetween can be expressed as follows;

$$R_P = R_{P2} \cdot R_{P1}$$

$$= \begin{bmatrix} M_2 & 0 \\ 0 & 1/M_2 \end{bmatrix} \cdot \begin{bmatrix} 1(a/f_2) - (f_2 - f_c) & 0 \\ (1/f_2) & -d_0/f_2 \end{bmatrix}$$

$$= \begin{bmatrix} M_2 [1 \cdot (a/f_2) - (f_2/f_c)] & 0 \\ -(1/M_2 f_2) & -d_0/(M_2 \cdot f_2) \end{bmatrix}$$

and the relation between the angle of inclination $\theta_p$ and the angle of deflection $\theta_m$ can be given by $\theta_m = -M_2 \cdot \theta_p \cdot f_2/d_0$.

$M_2$ represents the magnification of the second beam expander system and is $M_2 = -f_4/f_3$.

Also, the ray transfer matrix $R_{T1}$ of the whole system of the first beam expander which comprises the first and second lens groups $L_1$ and $L_2$ can be expressed as follows, by taking the magnification M1 of the first beam expander as $M_1 = -f_2/f_1$;

$$R_{T1} = \begin{bmatrix} M_1 & f_1 + f_2 + M_1 \cdot d_4 + (a/M_1) - (f_1 \cdot f_2/f_c) \\ 0 & 1/M_1 \end{bmatrix}$$

Accordingly, the ray transfer matrix of the whole first and second beam expander systems can be expressed as follows;

$$R_P = R_{P2} \cdot R_{T1}$$

$$= \begin{bmatrix} M_2 & 0 \\ 0 & 1/M_2 \end{bmatrix} \cdot$$

$$\begin{bmatrix} M_1 & M_2(f_1 + f_2 + M_1 \cdot d_4 + a/M_2 - f_1 \cdot f_2/fc) \\ 0 & 1/M_1 \end{bmatrix}$$

$$= \begin{bmatrix} M \cdot M_2 & M_2\{1 + (a/f_1) - (f_2/fc)\} \\ 0 & 1/(M_1 \cdot M_2) \end{bmatrix}$$

and the magnification of the whole beam expander system becomes $M_1 \cdot M_2$.

In the description with reference to FIGS. 5 through 11, paraxial analysis is performed by a thin lens using the ray transfer matrix. In actual practice, however, each of the lens systems comprises a plurality of thick lenses which also receives affection due to aberration. Therefore, they are sometimes disposed in a position that is slightly displaced from the paraxially analyzed position.

Next, the concrete construction of the apparatus according to the embodiment, together with the operation thereof will be described with reference to FIGS. 1 through 4, and FIGS. 12 and 13.

Figure 1:
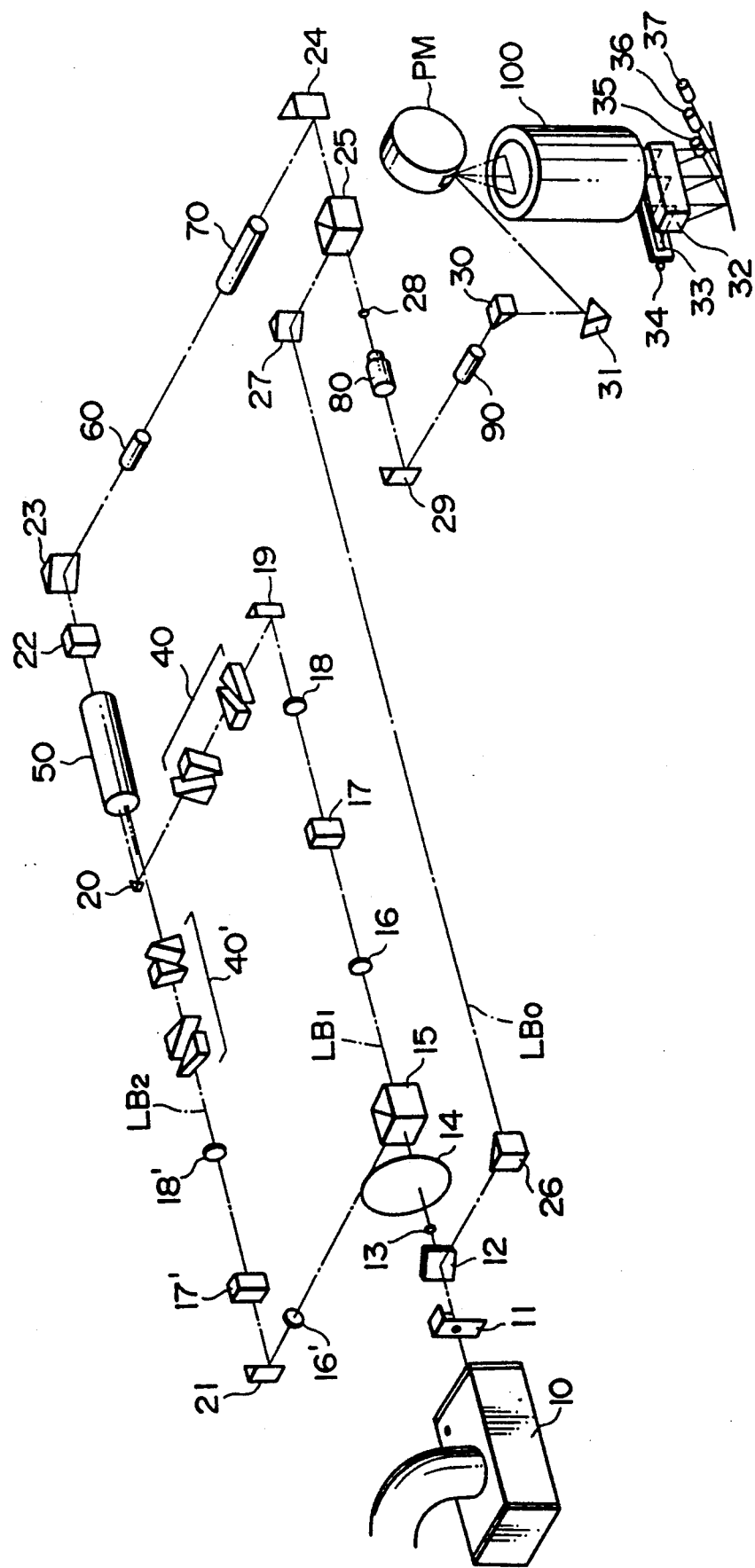
FIG. 1 is an explanatory view showing the arrangement of an optical system of a light scanning apparatus according to the present invention.

FIG. 1 is an explanatory view showing the arrangement of an optical system of a photo plotter according to the embodiment, and FIGS. 2 and 3 are schematic explanatory views obtained by developing a part thereof along the optical axis.

A laser beam emitted from an argon laser 10 as a light source is split by a 5% reflection half mirror 12 through a pin hole 11. The laser beam reflected by the half mirror 12 is utilized as a monitoring light beam $LB_0$ for detecting the correct position of a spot.

The laser beam transmitted through the half mirror 12 is rotated about its polarization direction by 90° through a first halfwave plate 13, its light is regulated by a variable filter 14 and is further splitted by a first beam splitter 15 which transmits 50% of the light and reflects 50% of the light The two split light beams are utilized as drawing light beams for forming two spots on the scanning surface.

The two spots are separated in the auxiliary scanning direction and scan on the adjacent scanning lines along the principal scanning direction in accordance with the rotation of the polygon mirror as the scan deflector. Furthermore, the two spots on the scanning surface are also separated in the principal scanning direction.

The reason for the two spots in the principal scanning direction is that as the distance between the two spots in the auxiliary scanning direction is set to be smaller than the spot diameter in order to draw accurately and unless such a distance is set, a portion of the two spots are overlapped. Therefore, there is a fear that the drawing performance becomes unstable due to interference between the two spots.

In order to compose two light beams into the same optical path, it is a general practice that they are composed using a polarized beam splitter. However, in order to split light beams emitted from one light source into three portions and compose them once again and then scanned by the same polygon mirror, the simple separation and composition are not enough to attain the purpose.

Therefore, in this optical system, the drawing light beams are distinguished from the monitoring light beam using polarization. The two drawing light beams are spatially separated and are incident to the lens system from different directions. Then, they are composed to the same position on the polygon mirror by this lens system.

As the light beam is spatially separated when the light beam is incident to the lens system, the incident light can be selected by physical means such as mirror, etc. instead of means utilizing polarization. When two beams have an angle $\Delta\theta$ on the polygon mirror, the distance between the centers of the spots formed on the scanning surface becomes $f \cdot \Delta\theta$. The optical system in which two light beams are separately incident and composed in a predetermined position can be utilized by a converging system or an afocal system.

Figure 12:
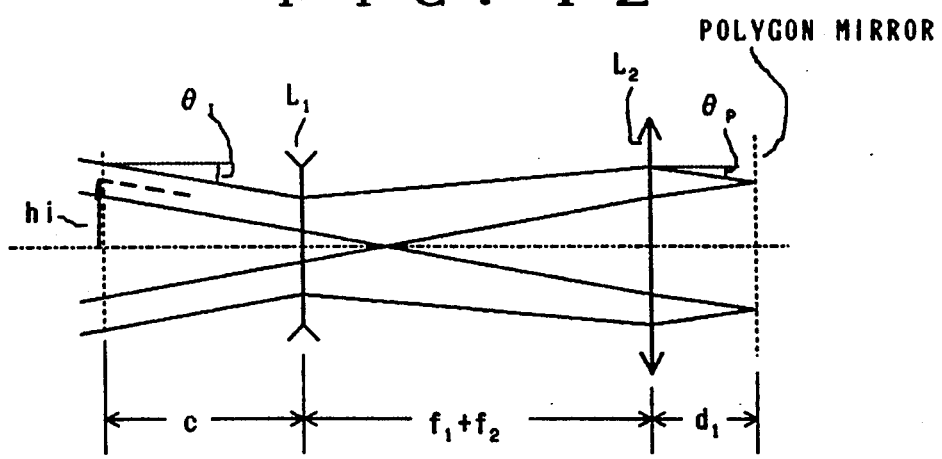
FIGS. 12 and 13 are explanatory views of a beam expander system showing the principle for spatially separating a plurality of light beams.

As an example, FIG. 12 shows two light beams which are symmetrically made incident to the afocal beam expander system with reference to the optical axis.

This system comprises two lens groups $L_1$ and $L_2$ which are converted into thin lenses of respective focal lengths $f_1(<0)$ and $f_2(>0)$ and displayed. A position s is defined, such that a distance between the position s and the first lens group $L_1$ is c. If it is presumed that the primary rays made incident in position s at an incident height hi and angle $\theta_I$ is composed in the same position as the angle $\theta_P$ by the polygon mirror surface which is located in position behind $d_1$ of the lens group $L_2$, the ray transfer matrix between the position s and the polygon mirror surface becomes as follows;

$$\begin{bmatrix} 0 \\ \theta_P \end{bmatrix} = \begin{bmatrix} M & f_1 + f_2 + M \cdot c + (d_1/M) \\ 0 & 1/M \end{bmatrix} \cdot \begin{bmatrix} hi \\ \theta_I \end{bmatrix}$$

wherein $M = -f_2/f_1$.

Therefore, it becomes as follows;

$$M \cdot hi + \{f_1 + f_2 + M \cdot c + (d_1/M)\} \cdot \theta_I = 0$$

$$hi = -(\theta_I/M) \cdot \{f_1 + f_2 + M \cdot c + (d_1/M)\}$$

$$= -\theta_P \cdot \{f_1 + f_2 + M \cdot c + (d_1/M)\}$$

If s is taken here as the position of the first surface when the lens system is converted to a plurality of thick systems, it is satisfactory only if two light beams are separated in the position s. That is, it is necessary to satisfy the following condition by taking the diameter of the incident light beam as Di;

$$|2hi\uparrow > Di$$

If $f_1 < 0$, i.e., $M > 0$, the reference signs of $\theta_I$ and $\theta_P$ are coincident with each other. Also, as $\{f_1+f_2+M\cdot c+(d_1/M)\}$ of the above-mentioned relation becomes positive, this condition can be satisfied by the arrangement as shown in FIG. 12. On the contrary, if $f_1 < 0$ and $M < 0$, the reference signs of $\theta_I$ and $\theta_P$ are different and therefore, the above condition cannot be satisifed unless a and $d_1$ are taken very long and $\{f_1+f_2+M\cdot c+(d_1/M)\}$ is negative.

Figure 13:
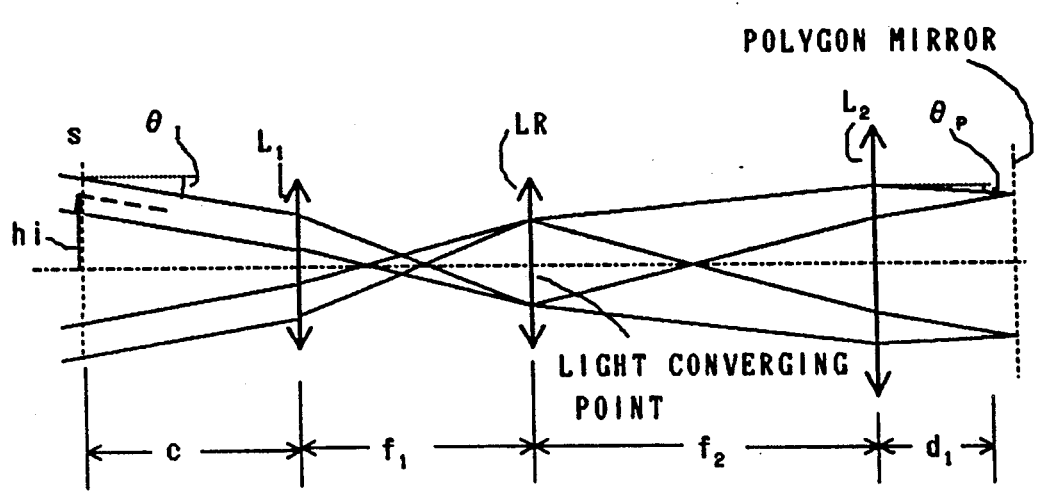

However, even if $f_1 > 0$, when the relay lens LR is provided in the light converging point as shown in FIG. 13 for example, the ray transfer matrix can be expressed as follows;

$$\begin{bmatrix} 0 \\ \theta_P \end{bmatrix} = \begin{bmatrix} M & f_1 + f_2 + M \cdot c + (d_1/M) - (f_1 \cdot f_2/fc) \\ 0 & 1/M \end{bmatrix} \begin{bmatrix} hi \\ \theta_I \end{bmatrix}$$

Therefore, it becomes as follows;

$$M \cdot hi + (f_1 + f_2 + M \cdot c + (d_1/M) - (f_1 \cdot f_2/fc)) \cdot \theta_I = 0$$

$$hi = (\theta_I/M) \cdot (f_1 + f_2 + M \cdot c + (d_1/M) - (f_1 \cdot f_2/fc))$$

$$= -\theta_P \cdot (f_1 + f_2 + M \cdot c + (d_1/M) - (f_1 \cdot f_2/fc))$$

As the term $-f_1 \cdot f_2/fc$ is added, the above condition can be realized with ease, as shown in FIG. 13.

In actual practice, relay lens 13 is not required to be disposed on the light converging point. If the principal points are displaced by providing a construction comprising a plurality of lenses, the lens surface can be displaced from the light converging point. By virtue of the foregoing arrangement, there can be diminished an adverse affect caused by dust, damage, etc. on the lens surface. In the case where the relay lens LR is considered as a part of the lens group $L_1$, in the lens system comprising the lens group $L_1$ and the relay lens LR, the focal length is $f_1$ and the distance between the principal points is negative. Therefore, it is enough if the same is replaced with a plurality of thick lenses in order to satisfy this relation and the degree of freedom of design can be increased. Even in the case where the relay lens LR is considered as a part of the lens group $L_2$, the same thing can be said.

In the case where the relay lens LR and the lens group $L_1$ are considered separately, the effect can be increased if they comprise a plurality of lenses so that the distance c from the first surface of the lens group $L_1$ to the first principal point can be made large. Furthermore, by combining the beam expander system in a multistage, the degree of freedom of the construction can be increased and the expanding magnification of the diameter of light beam can be made large.

A first drawing light beam $LB_1$ transmitted through the first beam splitter 15 is condensed to a first drawing AO modulator 17 through a lens 16.

The AO modulator 17 is adapted to diffract the laser, which is made incident from a direction satisfying the Bragg condition, by means of the input of supersonic waves into a transducer. By turning on/off the supersonic waves to be inputted, the laser beam can be switched over to a zero order light beam and to a first order deflected beam so as to utilize the first order light beam as a drawing light beam. The AO modulator 17 is controlled by a write signal acting as an exposure information of a dot unit with respect to the scanning surface.

The first order light beam is ON-light modulated and is re-made into a parallel light beam by a lens 18 which is disposed behind the AO modulator 17, then deflected by a first light beam direction adjusting device 40, which comprises four prisms, through a mirror 19 by a predetermined angle, and then reflected by a mirror 20 so as to be made incident to a first lens system 50.

On other hand, the second drawing light beam $LB_2$ reflected by the first beam splitter 15 is made into a converged light through a lens 16' and reflected by a mirror 21 so as to be made incident to a second drawing AO modulator 17'. The function of the AO modulator 17' is the same to the first drawing AO modulator 17. However, a signal for driving this second drawing AO modulator 17' is to be scanned on a line which is displaced by one line from that for the signal which is to be made incident to the first drawing AO modulator 17.

The first light beam from the second drawing AO modulator 17' is deflected by a second light beam direction adjusting device 40', which comprises four prisms, through a lens 18' by a predetermined angle and then made incident to the first lens system 50.

The lenses 16 and 16' have the parameters shown in Table 1, and the lenses 18 and 18' have the parameters shown in Table 2. In the Tables, reference character f denotes the focal length of the whole system, r denotes the radius of curvature of a lens surface, d denotes a lens thickness and air distance, and n denotes the refractive index of the lens.

TABLE 1

| face NO | f = 130.02 | | |
|---|---|---|---|
| | r | d | n |
| 1 | 98.137 | 3.60 | 1.80593 |
| 2 | 1520.979 | | |

TABLE 2

| face NO | f = 130.02 | | |
|---|---|---|---|
| | r | d | n |
| 1 | −1520.979 | 3.60 | 1.80593 |
| 2 | −98.137 | | |

The first and second light beam direction adjusting device, as shown in FIG. 4, comprise first and second prism groups P1 and P2 each having two prisms.

An x-axis is established parallel with the incident direction of the light beam and y- and z-axes perpendicular thereto in FIG. 4. The x-y plane of FIG. 4(A) shows a principal scanning section similar to that of FIG. 2, and the x-z plane of FIG. 4(B) shows an auxiliary scanning section similar to that of FIG. 3.

A first prism group P1 is disposed such that the incident and outgoing end faces of the first and second prisms 41 and 42 are parallel with the y-axis, respectively and the first prism 41 can be adjusted its rotation about the pivotal axis which is parallel with this y-axis.

Third and fourth prisms 43 and 44 of a second prism group P2 are disposed in the same manner as the first prism group P1 in their relative relation. However, each of the incident and outgoing end faces are parallel with the z-axis and the third prism 43 can be adjusted its rotation about the pivotal axis which is parallel with this z-axis.

In this apparatus, by adjusting the pivotal movements of the first prism 41 and the third prism 43, the direction of the outgoing light beam can be finely adjusted in accordance with the relation between the incident angle and the deflection angle. And in this embodiment, it is designed such that the first and second drawing light beams LB1 and LB2 have angles of 0.27° in the principal scanning direction and 0.034° in the auxiliary scanning direction with respect to each other and are made incident to the first lens system 40 from a position away by 0.48 mm in the auxiliary scanning direction.

Also, the first and second prism groups $P_1$ and $P_2$ are only concerned with the directional fine adjustment of the light beam within the x-z plane and the directional fine adjustment of the light beam within the x-y plane, and do not interfere with the adjustment in any other directions. Therefore, the adjustments in various direction can be performed independently.

The following Table 3 discusses the parameters of the construction of a light beam direction adjusting device having prism groups P1 and P2.

TABLE 3

| face NO | d | n | $\theta_1$ | $\theta_2$ |
|---|---|---|---|---|
| 1 | 10.00 | 1.52177 | 0.00 | 15.00 |
| 2 | 18.86 |  | 0.00 | 25.00 |
| 3 | 10.00 | 1.52177 | 0.00 | 25.24 |
| 4 | 120.00 |  | 0.00 | 15.24 |
| 5 | 5.00 | 1.52177 | 15.00 | 0.00 |
| 6 | 28.39 |  | 25.00 | 0.00 |
| 7 | 5.00 | 1.52177 | 26.82 | 0.00 |
| 8 |  |  | 16.82 |  |

In the above, $\theta_1$ represents the angle of the prism surface in the x-y plane; and $\theta_2$ represents the angle of the prism surface in the x-z plane.

The first lens system 50 to which the light beam from the light beam direction adjusting device 40 is made incident is a positive lens of three piece structure as shown in the development of FIGS. 3 and 4 and is adapted to converge the incoming laser beam. The construction parameters of the first lens system 50 are shown in Table 4. This first lens system has a long distance of 467.29 mm from the first surface to the first principal point in order to enhance the separate incidence. Also, the distance between the principal points is −361.70 mm. In this way, the whole optical system is miniaturized.

TABLE 4

| face NO | f = 179.99 | | |
|---|---|---|---|
|  | r | d | n |
| 1 | 94.500 | 5.74 | 1.80593 |
| 2 | ∞ | 70.14 |  |
| 3 | −40.350 | 5.52 | 1.80593 |
| 4 | 67.500 | 82.41 |  |
| 5 | 117.000 | 5.15 | 1.80593 |

TABLE 4-continued

| face NO | f = 179.99 | | |
|---|---|---|---|
|  | r | d | n |
| 6 | −117.000 |  |  |

A correction AO modulator 22 acting as a deflecting element for correcting affection due to the surface tilting of the polygon mirror PM is disposed at a position 54.67 mm away from the sixth surface of the first lens system 50 in air reduced distance and 61.95 mm this side from the light condensed point by the first lens system likewise in air reduced distance.

The drawing laser beam from the correction AO modulator 22 is reflected by a mirror 23 and allowed to be transmitted through a relay lens 60, comprising two piece structure as shown in Table 5. The positions of the two light beams are corrected by this relay lens system. As a consequence, the light beams are overlapped with each other and made incident to a second lens system 70, comprising a two piece structure as shown in Table 6. The distance between the correction AO modulator 22 and a first surface of the relay lens 60 is 140.38 mm. The distance between a fourth surface of the relay lens 60 and a first surface of the second lens system 70 is 76.55 mm.

TABLE 5

| face NO | f = 56.18 | | |
|---|---|---|---|
|  | r | d | n |
| 1 | 36.000 | 5.00 | 1.80593 |
| 3 | −68.000 | 19.23 |  |
| 3 | −26.650 | 5.00 | 1.80593 |
| 4 | 26.650 |  |  |

TABLE 6

| face NO | f = 299.99 | | |
|---|---|---|---|
|  | r | d | n |
| 1 | −242.198 | 2.50 | 1.80593 |
| 2 | 271.441 | 98.92 |  |
| 3 | 780.744 | 4.60 | 1.80593 |
| 4 | −166.058 |  |  |

The drawing laser beam, which has been made into a parallel light beam by the second lens system 70, is reflected by a mirror 24 and composed with a monitor light at a first polarized beam splitter 25. That is, the monitor light LBO, which has been split by the half mirror 12, is reflected by mirrors 26 and 27, made incident to the first polarized beam splitter 25 as an S-polarized light and then reflected.

On the other hand, the two drawing light beams are made into those which have different polarization directions from that of the monitor light by a first half-wave plate 13, so that the two drawing light beams are made incident as a P-polarized light and then transmitted.

The two drawing light beam and the monitor light beams are rotated about the polarization direction by a second half-wave plate 28, by 90° respectively and made incident to a fourth lens system comprising a two piece structure show a in Table 8; through a third lens system 80 comprising a four piece structure shown in Table 7 and a mirror 29. The distance between a fourth surface of the second lens system 70 and a first surface of the third lens system 80 is 317.00 mm. The distance between an eighth surface of the third lens system 80 and a first surface of the fourth lens system 90 is 296.94 mm, and the distance between a fourth surface of the fourth lens system 90 and polygon mirror PM is 1261.00 mm.

TABLE 7 f = −16.16

| face NO | r | d | n |
|---|---|---|---|
| 1 | −12.181 | 2.86 | 1.66091 |
| 2 | 353.663 | 3.71 | |
| 3 | −83.000 | 4.82 | 1.66091 |
| 4 | −29.440 | 29.30 | |
| 5 | 77.394 | 5.02 | 1.68718 |
| 6 | −480.000 | 2.23 | |
| 7 | 488.111 | 3.44 | 1.68718 |
| 8 | 30.000 | | |

TABLE 8 f = 346.22

| face NO | r | d | n |
|---|---|---|---|
| 1 | −238.573 | 4.61 | 1.63182 |
| 2 | −167.164 | 2.21 | |
| 3 | ∞ | 5.00 | 1.63182 |
| 4 | −365.980 | | |

The first lens system 50 and the second lens system 70 constitute a first beam expander system of having a magnification of 1.67 and which is adapted to expand the light beam, having the diameter of 0.7 mm to 1.17 mm. The third lens system 80 and the fourth lens system 90 constitute a second beam expander system having a 21.4 power of magnification, wherein the two drawing light beams are expanded to a diameter of from 1.17 mm to 25 mm.

In this embodiment, the Galilean type beam expander system is disposed behind the beam expander system of FIG. 6 mentioned above.

The two drawing light beams and the monitoring light beam are directed toward the polygon mirror PM after being reflected by mirrors 30 and 31 and reflected by this polygon mirror PM so as to be deflected.

The two drawing light beams are composed to the same position on the polygon mirror while having angles of 27 seconds (which is equal to 27/3600 degrees) with respect to each other and then reflected.

The relay lens system 60 is not concerned with the operation of these beam expander systems and have the correction AO modulator 22 and the polygon mirror PM conjugated with each other so as to correct the displacement of the light beams on the polygon mirror due to the correction of the surface tilting.

The light beam reflected by the polygon mirror PM is imaged by an f θ lens 100 as a scanning lens, having a focal length of 151 mm, while the drawing light beam is allowed to transmit through a second polarized beam splitter 32 and forms two spots, each having a diameter of 5 μm on the scanning surface.

On the other hand, the monitor light is reflected by the beam splitter 32 and made incident to a light receiving optical system 34 through a scale 33 which has a striped pattern perpendicular to the scanning direction. The light receiving optical system 34 outputs pulses having a frequency proportional to the scanning speed from the change of the transmitted light quantity of the light beam to be scanned on a scale 33.

The two spots formed on the scanning surface are formed spaced apart by 20 μm with respect to the principal scanning direction and by 2.5 μm equivalent to one line portion with respect to the auxiliary scanning direction.

The detection of the surface tilting can be performed with reference to the output power of a plurality of photoelectric converting elements disposed outside the drawing range in the vicinity of the scanning surface as shown, for example, in Japanese Patent Early Laid-open Publication No. Sho 57-84440.

In the above embodiment, although the two drawing light beams are separated by means of the spatial separation, the present invention is not limited to this. For example, the present invention can be applied to a case where three or more light beams are separated by spatial separation.

What is claimed is:

1. A light scanning apparatus comprising:
   a light source portion;
   a correction deflecting element for finely deflecting a light beam emitted by said light source portion in an auxiliary scanning direction;
   a scan deflector having at least two surfaces for deflecting a light beam from said correction deflecting element in a principal scanning direction, wherein said correction deflecting element deflects a light beam in order to eliminate an effect of inclination error of said at least two surfaces of said scan deflector;
   a lens system disposed between said light source portion and said scan deflector and adapted to bring said correction deflecting element and said scan deflector in an optically conjugate relation; and
   a scanning lens for imaging said light beam deflected by said scan deflector onto a scanning surface.

2. A light scanning apparatus according to claim 1, wherein said lens system further comprises a positive first lens group and a positive second lens group.

3. A light scanning apparatus according to claim 2, wherein said first and second lens groups are disposed between said light source portion and said scan deflector, wherein if the focal length of said first lens group is taken as $f_1$, the focal length of said second lens group is taken as $f_2$, the magnification of the whole lens system is taken as M, the distance from said correction deflecting element to said first lens group is taken as $d_\Theta$, and the distance from said second lens group to said scan deflector is taken as $d_1$, the following condition is satisfied:

$$f_1 + f_2 + M \cdot d_\Theta + (d_1/M) = 0.$$

4. A light scanning apparatus according to claim 3, wherein said lens system has a relay lens system having a focal length of fc between said first and second lens groups, and wherein the magnification of the whole system is taken as M, and the following condition is satisfied:

$$f_1 + f_2 + M \cdot d_\Theta + (d_1/M) - (f_1 \cdot f_2/fc) = 0.$$

5. A light scanning apparatus according to claim 4, wherein said relay lens comprise a combination of positive and negative lenses.

6. A light scanning apparatus according to claim 2, wherein said first lens group is disposed between said light source portion and said correction deflecting element and said second lens goup is disposed between said correction deflecting element and said scan deflector, wherein if the focal length of said first lens group is taken as $f_1$, the focal length of said second lens group is taken as $f_2$, the distance from said correction deflecting element to the focal position of said first lens group is taken as $d_\Theta$, and the distance from said second lens group to said scan deflector is taken as $d_1$, the following condition is satisfied:

$$d_1 = f_2 + (f_2{}^2/d_\Theta).$$

7. A light scanning apparatus according to claim 6, wherein said lens system has a positive relay lens having a focal length of fc between said correction deflecting element and said second lens group, and wherein the following condition is satisfied:

$$d_0 + f_2 - (d_0 \cdot d_1/f_2) - (f_2/fc) \cdot d_0 = 0.$$

8. A light scanning apparatus according to claim 7, wherein said relay lens comprise a combination of positive and negative lenses.

9. A light scanning apparatus according to claim 1, wherein said lens system further comprise a positive first lens group, a positive second lens group, a negative third lens group, and a positive fourth lens group.

10. A light scanning apparatus according to claim 9, wherein said first through fourth lens groups are disposed between said correction deflecting element and said scan deflector, and wherein the focal length of said first lens group is taken as $f_1$, the focal length of said second lens group is taken as $f_2$, the focal length of said third lens group is taken as $f_3$, the focal length of said fourth lens group is taken, as $f_4$, the magnification of said first and second lens groups is taken as $M_1$, the magnification of said third and fourth lens groups is taken as $M_2$, the distance from said correction deflecting element to said first lens group is taken as $d_\Theta$, the distance from said second lens group to said third lens group is taken as $d_2$, the distance from said fourth lens group to said scan deflector is taken as $d_3$, and the following condition is satisfied:

$$d_2 = a + b,$$

wherein, $a = -M_1(f_1 + f_2 + M_1 \cdot d_\Theta)$; and
$b = -(1/M_2) \cdot \{f_3 + f_4 + (d_3/M_2)\}$.

11. A light scanning apparatus according to claim 9, wherein said first lens group is disposed between said light source portion and said correction deflecting element, said second through fourth lens groups are disposed between said correction deflecting element and said scan deflector, and a positive relay lens is disposed between said correction deflecting element and said second lens group, and wherein the focal length of said first lens group is taken as $f_1$, the focal length of said second lens group is taken as $f_2$, the focal length of said third lens group is taken as $f_3$, the focal length of said fourth lens group is taken as $f_4$, the focal length of said relay lens is taken as fc, the magnification of the third and fourth lens groups is taken as $M_2$, the distance from said correction deflecting element to said first lens group is taken as $d_\Theta$, the distance from said second lens group to said third lens group is taken as $d_2$, the distance from said fourth lens group to said scan deflector is taken as $d_3$, and the following condition is satisfied:

$$d_2 = a + b,$$

wherein $a = f_2(1 + (f_2/d_\Theta) - (f_2/fc))$; and
$b = -(1/M_2) \cdot \{f_3 + f_4 + (d_3/M_2)\}$.

12. A light scanning apparatus according to claim 1, wherein said light source portion emits a plurality of light beams so that said plurality of light beams are made incident to said scan deflector.

13. A light scanning apparatus according to claim 12, wherein said light source portion includes a single light source, and an optical path splitting element for splitting said light beams coming from said single light source.

14. A light scanning apparatus according to claim 13, wherein said optical path splitting element comprises a half mirror adapted to split light beams irrespective of a polarization direction thereof.

15. A light scanning apparatus according to claim 12, wherein said light source portion includes a first optical path splitting element for splitting a drawing light beam and a monitoring light beam, and a second optical path splitting element for further splitting said drawing light beam.

16. A light scanning apparatus according to claim 15, wherein said light source portion has a light beam direction adjusting device for spatially separating said split drawing light beam and causes it to be made incident to said lens system disposed between said light source portion and said scan deflector.

17. A light scanning apparatus according to claim 16, wherein said light beam direction adjusting device comprises a first prism group comprising two prisms for adjusting the direction of a light beam in the principal scanning direction, and a second prism group comprising two prisms for adjusting the direction of light flux in the auxiliary scanning direction.

18. A light scanning apparatus according to claim 16, wherein said lens system comprises a first lens group having a focal length of $f_1(<0)$ and a second lens group having a focal length of $f_2(>0)$, and wherein an incident height of said light beam, as it intersects a vertical plane located at a side of said first lens group facing said light source portion is taken as hi, the incident angle of said light beam is taken as $\Theta_I$, the distance from said second lens group to said scan deflector is taken as $d_1$, and the following condition is satisfied:

$$hi = -(\Theta_I/M) \cdot \{f_1 + f_2 + M \cdot c + (d_1/M)\},$$

wherein $M = -f_2/f_1$.

19. A light scanning apparatus according to claim 16, wherein said lens system includes a first lens group having a focal length of $f_1(>0)$, a second lens group having a focal length of $f_2(>0)$, and a relay lens disposed between said first and second lens groups and having a focal length of fc(>0), and wherein the incident height of said light beam as it intersects a vertical plane located at a side of said first lens group facing said light source portion, is taken as hi, the incident angle of said light beam is taken as $\Theta_I$, the distance from said second lens group to said scan deflector is taken as $d_1$, and the following condition is satisfied:

$$hi = (\Theta_I/M) \cdot (f_1 + f_2 + M \cdot a + (d_1/M) - (f_1 \cdot f_2/fc)).$$

20. A light scanning apparatus according to claim 1, further comprising means for driving said correction deflecting element to correct for an undesired surface tilting of said scan deflector.

21. A light scanning apparatus according to claim 1, wherein said lens system comprises at least one spherical lens.

22. A light scanning apparatus according to claim 1, wherein lenses employed in said lens system consist of spherical lenses.

23. A light scanning apparatus, comprising:
a light source portion for emitting a plurality of light beams;
light beam separating means for spatially separating said plurality of light beams and outputting said plurality of light beams at different angles with respect to each other;
a lens system for making incident said plurality of light beams from said separating means and superposing them in a predetermined position on an optical path;
a scan deflector disposed in a position where said plurality of light beams are superposed one upon the other and adapted to deflect said superposed light beams; and
a scanning lens for separating said deflected light beams and imaging said deflected light beams onto a scanning surface.

24. A light scanning apparatus according to claim 23, wherein said light source portion includes a single light source and an optical path splitting element for splitting said light beams coming from said single light source.

25. A light scanning apparatus according to claim 24, wherein said optical path splitting element comprises a half mirror for splitting said light beams, irrespective of the polarization direction thereof.

26. A light scanning apparatus according to claim 23, wherein said light source portion includes a first optical path splitting element for splitting a drawing light beam and a monitoring light beam, and a second optical path splitting element for further splitting said drawing light beam.

27. A light scanning apparatus according to claim 26, wherein said apparatus further comprises second separating means for spatially separating said split drawing light beam and making incident the same to said lens system disposed between said light source portion and said scan deflector.

28. A light scanning apparatus according to claim 23, wherein said lens system comprises a first lens group having a focal length of $f_1(<0)$, and a second lens group having a focal length of $f_2(>0)$, and wherein the incident height of a light beam, as it intersects a vertical plane located at a side of said first lens group facing said light source portion, is taken as hi, a distance between said vertical plane and the first lens group is taken as c, the incident angle of the light beam is taken as $\Theta_I$, the distance from said second lens group to said scan deflector is taken as $d_1$, and the following condition is satisfied:

$$hi = -(\Theta_I/M) \cdot \{f_1 + f_2 + M \cdot c + (d_1/M)\},$$

wherein $M = f_2/f_1$.

29. A light scanning apparatus according to claim 23, wherein said lens system includes a first lens group having a focal length of $f_1(>0)$, a second lens group having a focal length of $f_2(>0)$, and a relay lens disposed between said first and second lens groups and having a focal length of $fc(>0)$, and wherein the incident height of a light beam, as it intersects a vertical plane located at a side of said first lens group facing said light source portion, is taken as hi, a distance between said vertical plane and the first lens group is taken as c, the incident angle of the light beam is taken as $\Theta_I$, the distance from said second lens group to said scan deflector is taken as $d_1$, and the following condition is satisfied:

$$hi = (\Theta_I/M) \cdot (f_1 + f_2 + M \cdot c + (d_1/M) - (f_1 \cdot f_2/fc)).$$

30. A light scanning apparatus, comprising:
a light source for emitting a single light beam;
a first optical path splitting element for splitting said light beam into a drawing light beam and a monitoring light beam;
a half-wave plate for rotating a polarizing direction of such split drawing light beam by 90°;
a second optical path splitting element for splitting said drawing light beam into two portions;
a modulator disposed in an optical path of each portion of said split drawing light beam adapted to modulate split drawing light beam;
a light beam direction adjusting means for spatially splitting each portion of said split drawing light beam into a plurality of light beams and outputting them at different angles with respect to each other;
a correction deflecting element for finely deflecting said light beam emitted from said light source in an auxiliary scanning direction;
a polarizing beam splitter for composing two drawing light beams from said correction deflecting element and said monitoring beam;
a scan deflector for deflecting said composed light beams in a principal scanning direction;
a lens system disposed between said correction deflecting element and said scan deflector and adapted to bring said correction deflection element and said scan deflector in an optically conjugate relation; and
a scanning lens for imaging said deflected light beam by said scan deflector onto a scanning surface.

31. A light scanning apparatus including:
a light source portion;
a correction deflecting element for finely deflecting a light beam emitted by said light source portion in an auxiliary scanning direction to correct for an undesired surface tilting of a scan deflector;
said scan deflector having at least two surfaces for deflecting a light beam from said correction deflecting element in a principal scanning direction, wherein said correction deflecting element deflects a light beam in order to eliminate an effect of inclination error of said at least two surfaces of said scan deflector;
a lens system disposed between said light source portion and said scan deflector and adapted to bring said correction deflecting element and said scan deflector in a generally optically conjugate relation; and
a scanning lens for imaging a light beam deflected by said scan deflector onto a scanning surface.

32. A light scanning apparatus including:
a light source portion;
a correction deflecting element for finely deflecting a light beam emitted by said light source portion in an auxiliary scanning direction;
a scan deflector for deflecting a light beam from said correction deflecting element in a principal scanning direction;

a lens system disposed between said light source portion and said scan deflector and adapted to reduce the resulting displacement of a light beam on a surface of said scan deflector due to fine deflection of the light beam caused by said correction deflecting element, wherein said correction deflecting element deflects a light beam in order to eliminate an effect of inclination error of said surface of said scan deflector; and a scanning lens for imaging a light beam deflected by said scan deflector onto a scanning surface.

* * * * *

UNITED STATES PATENT AND TRADEMARK OFFICE
CERTIFICATE OF CORRECTION

PATENT NO. : 5,194,981
DATED : March 16, 1993
INVENTOR(S) : A. MORIMOTO

It is certified that error appears in the above-indentified patent and that said Letters Patent is hereby corrected as shown below:

At column 17, line 18 (claim 8, line 2), change "comprise" to ---comprises---.
At column 17, line 21 (claim 9, line 2), change "comprise" to ---comprises---.

Signed and Sealed this

Twenty-ninth Day of November, 1994

Attest:

BRUCE LEHMAN

*Attesting Officer*    *Commissioner of Patents and Trademarks*